United States Patent
Baranga et al.

(10) Patent No.: US 10,672,266 B2
(45) Date of Patent: Jun. 2, 2020

(54) SYSTEMS AND METHODS FOR MONITORING ROADWAYS USING MAGNETIC SIGNATURES

(71) Applicant: TollSense, LLC, Flower Mound, TX (US)

(72) Inventors: Alex Baranga, Flower Mound, TX (US); Chris Georgieff, Mission Viejo, CA (US)

(73) Assignee: TollSense, LLC, Flower Mound, TX (US)

( * ) Notice: Subject to any disclaimer, the term of this patent is extended or adjusted under 35 U.S.C. 154(b) by 169 days.

(21) Appl. No.: 15/901,615

(22) Filed: Feb. 21, 2018

(65) Prior Publication Data
US 2018/0182240 A1 Jun. 28, 2018

Related U.S. Application Data

(63) Continuation-in-part of application No. 14/987,966, filed on Jan. 5, 2016, now Pat. No. 9,934,682.

(51) Int. Cl.
*G08G 1/042* (2006.01)
*G07B 15/02* (2011.01)
(Continued)

(52) U.S. Cl.
CPC ............. *G08G 1/042* (2013.01); *G07B 15/02* (2013.01); *G07B 15/063* (2013.01); *G08G 1/017* (2013.01);
(Continued)

(58) Field of Classification Search
CPC ........ G08G 1/042; G08G 1/207; G08G 1/017; G08G 1/0112; G07B 15/063; G07B 15/02; H04W 4/44; H04W 4/02
See application file for complete search history.

(56) References Cited

U.S. PATENT DOCUMENTS 6,185,496 B1   2/2001   Matsuno
6,195,020 B1   2/2001   Brodeur
(Continued)

FOREIGN PATENT DOCUMENTS

EP   2474877 A1   11/2012

OTHER PUBLICATIONS

Honeywell International, Application Note—AN 218, Vehicle Detection Using AMR Sensors, Aug. 2005.
(Continued)

*Primary Examiner* — Thomas G Black
*Assistant Examiner* — Ana D Thomas
(74) *Attorney, Agent, or Firm* — RegitzMauck PLLC; Michael Regitz; Dustin Mauck

(57) ABSTRACT

A system and method are disclosed for using magnetic signatures at predetermined positions along a roadway to monitor traffic travelling along the roadway by comparing the predetermined magnetic signatures with magnetic signatures being dynamically and continuously measured by each vehicle as they travel along the roadway. Magnetometers incorporated into mobile devices or otherwise incorporated within the vehicle measure magnetic signatures for comparison to the predetermined magnetic signatures that form a connection graph or database of points that correspond to possible paths along a roadway. When a magnetic signature match is made, the system recognizes that the vehicle has passed a particular point on a roadway and forwards that information to the appropriate entity for further processing, analysis, or toll assessment.

20 Claims, 7 Drawing Sheets

(51) Int. Cl.
  *G07B 15/06* (2011.01)
  *H04W 4/02* (2018.01)
  *H04W 4/44* (2018.01)
  *G08G 1/017* (2006.01)
  *G08G 1/00* (2006.01)
  *G08G 1/01* (2006.01)

(52) U.S. Cl.
  CPC ........... *G08G 1/0112* (2013.01); *G08G 1/207* (2013.01); *H04W 4/02* (2013.01); *H04W 4/44* (2018.02)

(56) References Cited

U.S. PATENT DOCUMENTS

| | | | |
|---|---|---|---|
| 6,513,252 B1* | 2/2003 | Schierbeek | G01C 17/38 324/244 |
| 6,937,165 B2 | 8/2005 | Rogers | |
| 7,679,499 B2 | 3/2010 | Yamada | |
| 8,145,419 B2 | 3/2012 | Onome | |
| 8,456,326 B2 | 6/2013 | Sakata | |
| 8,531,180 B2 | 9/2013 | Piemonte | |
| 8,798,924 B2 | 8/2014 | Haverinen | |
| 8,928,495 B2 | 1/2015 | Hassib et al. | |
| 9,080,874 B2 | 7/2015 | Haverinen | |
| 2002/0065600 A1* | 5/2002 | Oka | G08G 1/042 701/516 |
| 2003/0060969 A1* | 3/2003 | Waite | G08G 1/0104 701/117 |
| 2003/0225516 A1* | 12/2003 | DeKock | G08G 1/0104 701/117 |
| 2007/0162218 A1* | 7/2007 | Cattin | G08G 1/015 701/117 |
| 2009/0043504 A1* | 2/2009 | Bandyopadhyay | G01C 17/38 701/469 |
| 2010/0134322 A1* | 6/2010 | Yoo | G08G 1/042 340/935 |
| 2010/0241391 A1* | 9/2010 | Pelczar | G08G 1/042 702/141 |
| 2012/0105055 A1 | 5/2012 | Takahashi | |
| 2012/0161987 A1* | 6/2012 | Yoo | G08G 1/042 340/933 |
| 2012/0169327 A1* | 7/2012 | Parco | G06F 1/1626 324/244 |
| 2013/0018705 A1 | 1/2013 | Heath | |
| 2013/0057264 A1* | 3/2013 | Robinet | G01P 3/42 324/207.24 |
| 2013/0154855 A1* | 6/2013 | Yoo | G08G 1/042 340/935 |
| 2013/0325243 A1 | 12/2013 | Lipkowski | |
| 2014/0179351 A1 | 6/2014 | Hannon | |
| 2014/0180627 A1* | 6/2014 | Naguib | G01C 17/38 702/150 |
| 2014/0232563 A1* | 8/2014 | Engler | G08G 1/017 340/933 |
| 2014/0325858 A1* | 11/2014 | Mayor | G01C 17/38 33/303 |
| 2014/0379207 A1 | 12/2014 | Katsman | |
| 2015/0087264 A1 | 3/2015 | Goyal | |
| 2015/0154578 A1 | 6/2015 | Sunil Goel | |
| 2015/0170514 A1 | 6/2015 | Stenneth | |
| 2016/0084659 A1* | 3/2016 | Yang | G01C 21/206 702/150 |
| 2016/0171787 A1* | 6/2016 | Yohalashet | G07B 15/063 705/13 |
| 2016/0216304 A1* | 7/2016 | Sekelsky | B64C 39/024 |
| 2016/0328960 A1* | 11/2016 | Broers | G08G 1/0116 |
| 2017/0110015 A1* | 4/2017 | Sekelsky | B64C 39/024 |

OTHER PUBLICATIONS

Pelmorex Canada Inc., Beat the Traffic—Android Apps on Google Play, May 2015.
Miguel Lopes De Almeida, Mobile Tolling—A Geotracking Capable Mobile Application for Toll Fee Collection, Faculdade de Ciencias e Technologia Universidade de Coimbra Departmento de Engenharia Informatica, Masters Degree in Informatics Engineering Internship Dissertation, Jul. 8, 2014, Coimbra, Portugal.

* cited by examiner

SYSTEMS AND METHODS FOR MONITORING ROADWAYS USING MAGNETIC SIGNATURES

The present application claims priority under 35 U.S.C. § 120 as a continuation-in-part of U.S. application Ser. No. 14/987,966, filed Jan. 5, 2016.

TECHNICAL FIELD

The present invention relates generally to the use of magnetic signatures to accurately monitor roadways.

BACKGROUND OF THE INVENTION

It is axiomatic that the ability to accurately monitor roadways and the vehicles that travel upon them can provide vital information to public or private entities that are charged with building, developing, maintaining, and managing the roadway systems to improve traffic conditions and plan for future transportation needs. Understanding the nature of traffic patterns on a macro level allows the responsible entities to evaluate and approve construction projects designed to alleviate problems in areas where traffic congestion is especially troublesome. Access to travel information on an individualized basis has been historically inaccurate and/or expensive to collect, aggregate, and analyze. Because of the inherent need to assess tolls for users of certain publicly-financed roads, much of the progress in this area has been made in relation to tollways.

Tollways, also known as toll roads, provide a way for governments to finance highway infrastructure projects and to reduce overall traffic congestion by assessing tolls on the actual users of the tollways. While most roads in the U.S. are built and maintained using local, state, and/or federal funds, charging tolls to vehicles as they travel along tollways has become an important source of financing for cash-strapped governments in the United States and abroad. However, tollways have their drawbacks, not the least of which is the inefficient collection of tolls in a way that can adversely impact traffic.

Even today, some tollways collect tolls using manned toll booths. The disadvantages of this are evident in that they require vehicles to slow down and/or stop to complete the payment transaction with a live employee that is stationed in the toll booth to collect the applicable toll, either in cash or by payment card. Some of the toll booths are unmanned and automatic toll collection is facilitated by machines where the applicable toll is paid by throwing coins into a basket. Even in systems that combine manned toll booths and automatic toll booths, the toll plazas often require the expansion of lanes at various points in the tollway in order to account for the traffic slowdown caused by the reduced throughput associated with requiring cars to slow down or even stop as they pass through the toll plazas. Various automatic toll collection systems are available, and these usually involve some form of transponder secured to the vehicle that communicates with electronic toll collection equipment mounted onto toll plazas or toll structures as the vehicle passes under the electronic toll collection equipment. Many of the systems utilize RFID (Radio Frequency Identification) technology to facilitate the communication between the transponder and the electronic toll collection equipment. Although these automatic toll collection systems are an improvement over manned toll booths, they still require large expenditures for both the electronic toll collection equipment and transponders for the vehicles in order to function. Transponders must be purchased, transponder identifications must be logged and assigned to individual vehicles, and then the transponders must be issued to the users, who must then attach them to the relevant vehicle to ensure effective transmission of the appropriate signal to the electronic toll collection equipment, which must be activated and mounted at strategically-located toll structures or toll plazas to assess the appropriate tolls on vehicles using the toll roads.

Other advances such as optical technologies that take pictures of the license plates of vehicles that pass through toll gates and then bill the owners of the vehicles accordingly have the similar benefit as those that utilize electronic toll equipment (e.g., no need for the vehicles to slow down). However, the processing costs of identifying the vehicles that do not have transponders (e.g., on tollways that use a combination of photo and transponder technology) by cross referencing all of the vehicles that pass through a particular toll gate against those that have the appropriate transponder technology can be high. In those cases where the tollway authority bills the owner of the vehicle directly, there is also a cross-referencing exercise that must be performed to identify the owner of the vehicle by obtaining the records associated with the license plate number of the vehicle. However, just because someone is operating a vehicle through a tollway does not mean that she is the owner of the vehicle. Nor will the government agency charged with maintaining vehicle ownership information necessarily have current information on the actual owner of every vehicle in their state. For example, if the owner of a vehicle sells that vehicle, it can be up to the new owner or the old owner to alert the relevant agency of the change in ownership. This process can be intentionally or unintentionally delayed, and in cases where the new owner uses tollways, the bill for those tolls would be assessed to the previous owner, most often through no fault of the tollway agency or the previous owner of the vehicle.

Even where electronic toll solutions are used, opportunities for theft of services and billing individuals for tolls they did not incur abound. For example, theft of the transponders and subsequent use in vehicles not associated with the individual to which the transponder was issued can result in the billing of multiple tolls to the theft victims that is often compounded because the victim is not immediately aware that the transponder has been stolen. Also, the risk that an RFID transponder may be cloned and used for illegal purposes is significant in view the technology available for those willing to engage in such illegal activities for profit.

Tolls charged to rental car companies that should properly be charged to the driver using the tollways also cause problems and significant transactional inefficiencies. By the time the rental car company receives the toll invoice from the tollway authority, the rental transaction is usually completed. In order to assess the toll to the proper driver, the rental company must cross-reference its rental records against one or more tollway invoices to determine which customer should be charged for the toll. Then the rental car company must initiate a new transaction to invoice the client for the toll charge and then collect that toll charge. The other option is for the rental car company to absorb the tolls as a cost of doing business. Rental car companies would much prefer that any tollway charges associated with their rental vehicles be assessed directly to the driver of the rental vehicle, which would effectively eliminate the rental car companies' involvement with toll assessment and collection activities.

Global positioning systems (GPS) are often utilized to provide location-based services in many applications based on GPS receivers installed in many mobile devices (e.g., cellular phones, vehicle tracking systems). The GPS receiver communicates with GPS satellites, which transmit information about their trajectory and transmission time to the GPS receiver. The GPS receiver can then calculate its position as a set of coordinates. However, the accuracy of GPS is limited and depends on many factors (e.g., the quality of the GPS receiver, the position and number of GPS satellites, the characteristics of the transmission environment, the weather). Further, even the most precise GPS will determine the position of the device within 10 feet under the most ideal conditions (e.g., not accounting for line of sight requirements or adverse environmental conditions). Because tollways often run parallel to frontage roads that are not subject to tolls, the use of GPS to charge tools to vehicles as they move along the tollways can be problematic because the inherent inaccuracy of GPS systems could result in inadvertently and incorrectly charging tolls to vehicles traveling along a frontage road.

It would be beneficial if a solution were available that would allow the entities responsible for roadways to accurately and cost-effectively monitor roadway traffic and collect data on roadway usage of individual drivers and passengers. Applications of such a solution would include allowing tollway authorities to assess and collect tolls from actual users of the tollways without having to make significant expenditures in infrastructure or incur costs relating to related processing costs. An inexpensive tollway solution that could ensure that the individuals using the tollways are the individuals that are billed the associated tolls would also be advantageous. It would also be beneficial if there were a vehicle monitoring system and process that that could more precisely identify and track the location and movement of a vehicle in order to accurately calculate vehicle miles traveled (VMT), provide for instantaneous marketing opportunities, produce the locational data needed for self-driving vehicles, and integrate with dedicated short range communications (DSRC) used to support vehicle safety applications, communication between vehicle-based devices, and infrastructure designed to reduce collisions.

BRIEF SUMMARY OF THE INVENTION

This invention utilizes the Earth's magnetic field (geomagnetic field) and takes advantage of measurement instruments (e.g., magnetometers) contained in popular portable devices (e.g., smartphones, wireless-enabled tablets, etc.), or as incorporated into vehicles themselves, to accurately and cost-effectively monitor roadways and the traffic on those roadways. Some embodiments of the invention are particularly useful in assessing tolls to vehicles and/or individuals that travel along tollways. Every point on the Earth has a substantially unique geomagnetic signature that can be measured, and in certain applications of the invention, used to generate a geomagnetic map of a roadway. Vehicles equipped with the appropriate instruments are also able to measure and record geomagnetic signatures as they travel along roadways. These geomagnetic signatures can then be compared with the geomagnetic signatures that comprise a geomagnetic roadway map to determine whether the vehicle is travelling along a particular roadway.

Unlike other positioning solutions (e.g., GPS), consistent position accuracy of within 1 to 3 feet can be achieved, so that vehicles traveling on a frontage road, for example, will not be confused with vehicles travelling on the tollway and errantly charged a toll. Further, in comparison to traditional toll collection schemes (e.g., manned tollway plazas, coin baskets, RFID tracking), this exemplary application of the solution provided by this embodiment of the invention does not require the installation of any infrastructure or other equipment in order to be implemented on the tollway. As such, tolls can be accurately and cost-effectively assessed on properly equipped vehicles and/or individuals with portable computing devices that choose to use tollways in their travels. Furthermore, due to the lack of infrastructure and hardware necessary to effectuate embodiments of the invention, non-toll roads can easily and cost effectively be converted to toll roads, and vice versa.

The accuracy of the positional data provided allow for an array of marketing and advertising opportunities for tailored offers to be made to properly equipped vehicles and/or individual users with portable computing devices that implement an embodiment of the invention. Other embodiments of the invention allow for precise tracking and calculation of VMT and precise control of self-driving vehicles using the geomagnetic signature matching functionality described herein. Still other embodiments of the invention utilize DSRC to prevent vehicular collisions via vehicle-to-vehicle and/or vehicle-to-infrastructure communications that convey critical vehicular positioning data based on geomagnetic signature matching functionality.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
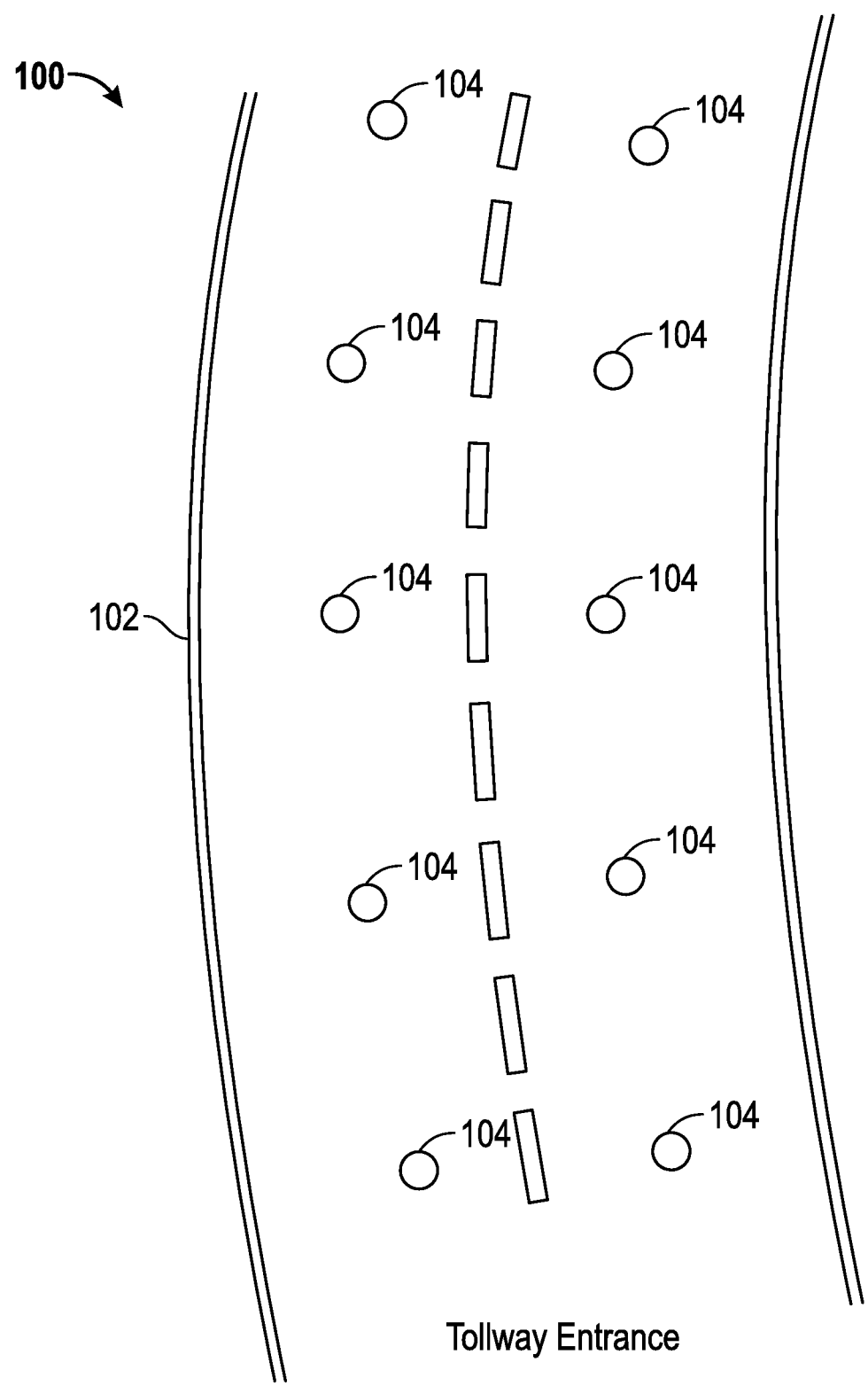
FIG. 1 is a diagram of a portion of a roadway embodying the principles of the invention as a tollway map is being created by measuring and recording the magnetic signatures of particular points along the tollway.

Devices equipped with magnetometers are able to identify unique geomagnetic signatures for every position on the Earth. A magnetometer generally measures the direction of its position from the magnetic North Pole and the strength of the Earth's magnetic field at that location. The combination of the heading and strength measurements at a particular location is often referred to as the geomagnetic signature or magnetic fingerprint of that physical location. While latitude and longitude values are unique in their identification of points on the Earth, magnetometer heading and strength values are theoretically capable of repeating at various points on the Earth. Therefore, because magnetometer measurements are not guaranteed to be unique across every point on the Earth (e.g., the strength of the magnetic field across the Earth changes in a non-linear fashion), reliability of their use for location identification applications is improved by utilizing them in a system in which geomagnetic signatures are prerecorded, assembled, and connected in a database and/or graph of signatures of relatively close proximity, and then compared to dynamic measurements collected by mobile magnetometers. One method of creating the relevant graph connections includes recording the direction of movement by measuring heading changes and orientation data from an accelerometer, which also happens to be a common feature of many smartphones and onboard computers on the market. Combining these measurements facilitates an accurate assessment of the direction the magnetometer is moving and the corresponding connection of geomagnetic signatures within a graph and/or database. Measurement instruments that perform the same functions as magnetometers can also be used. Whether they have a magnetometer or other substantially equivalent measurement device incorporated within them, mobile devices used to measure geomagnetic signatures in embodiments of the invention are generally processor-based devices (e.g., smartphones, smartwatches, tablets, onboard computers, etc.), but they can also utilize cloud-based or distributive computing principles to perform various processes associated with the invention (e.g., measurement, recording, processing, comparing, etc.).

Once the initial identification readings are recorded, a graph or map can be created whereby subsequent readings by magnetometers can be matched against the previously identified geomagnetic signatures. This positioning solution is presently accurate to within 1 to 3 feet, and does not have the "line of sight" or other environmental limitations of GPS or other positioning systems that can limit their accuracy. Because mobile devices such as smartphones are generally equipped with magnetometers, this highly accurate magnetic signature matching system can be used to accurately monitor roadway usage and traffic conditions, and can also be used to accurately assess tolls with a minimum of expense. Tollway authorities seeking to take advantage of certain embodiments of the invention can encourage tollway users to download a tollway application onto their smartphones or onboard computers (i.e., computers incorporated into vehicles), for example, and their tollway travel history, toll assessment, and toll collection activities can be facilitated through their smartphones or onboard computers. It is further envisioned that tollway applications will be pre-loaded onto onboard computers or other onboard units that communicate using DSRC or similar services and technology that may be incorporated directly into new vehicles. As discussed below, this system eliminates the need for tollway plazas, toll collection equipment, and the costs and infrastructure associated with electronic toll collection (e.g., transponders). In cases where embodiments of the invention include DSRC to facilitate vehicle safety protocols, automatic inclusion of the application into the onboard vehicle computing means that perform such functions is envisioned. For example, when the invention detects that the vehicle is in danger of colliding with another vehicle or stationary object, it can automatically trigger an alert or implement appropriate evasive maneuvers to prevent such a collision form occurring using DSRC or other high-speed communication protocols. Similarly, embodiments of the invention that allow for precise vehicle location information to be utilized for navigation protocols in self-driving vehicles are uniquely appropriate for these applications due to the highly precise nature of the information provided.

Geofencing solutions (e.g., using GPS to activate or deactivate the tollway application) can be used to conserve power at the device level. A geofence functions as a virtual perimeter for a real-world geographic area. Geofences generally consist of a geolocation defined by a latitude and longitude, along with a radius value. Modern smartphone operating systems usually include the ability to define geofences using GPS functionality that also provides system-level responses and notifications whenever defined geofences are crossed by the smartphone at issue. Put simply, the smartphone operating system constantly monitors all defined or registered geofences, and when a geofence-crossing event occurs, the appropriate notification signal will be triggered, which can effectively eliminate the need for an application code to check and respond to geofence-crossing events. However, application codes may also be used to perform the same notification function in certain embodiments of the invention. Onboard computers incorporated into vehicles possess the same or similar functionality and capabilities.

The use of geofences in certain embodiments of the invention substantially decreases the amount of time that the tollway application actively monitors the geomagnetic signatures as measured by the magnetometer, which in turn positively impacts smartphone battery usage and charge life cycle. Further, application dataset requirements for constant active monitoring of geomagnetic signatures may be too large to use effectively in certain embodiments of the invention. Utilizing geofences will limit the amount of geomagnetic data being recorded by the tollway application for ultimate comparison with the prerecorded geographic points on the tollways at issue. Depending on operating system limits on the number of geofences that can be defined and registered at any given time, filtering mechanisms based on other location based system functionality (e.g., using township grids) activated in the smartphone operating system can be used to dynamically activate and deactivate geofences as the smartphone moves closer to or further away from tollway-relevant geofences.

As an alternative to geofences, other embodiments of the invention utilize a beacon stationed at the tollway entrance to activate the tollway application and a beacon stationed at the tollway exit to deactivate the tollway application. Although a wide range of beacons can be used in this manner, commonly used beacons that can be generally described as micro-location based devices that identify devices using the Bluetooth wireless technology standard (e.g., smartphones, onboard computers) are implemented in various embodiments of the invention. Beacons can also be used in conjunction with geofences to provide a redundant triggering mechanism for the activation and deactivation of the tollway application in an even more precise manner to ensure proper functioning and activation of the tollway application. By using protocols such as iBeacon, the tollway application can determine its location relative to a beacon, which also might be located along various points along the roadway to offer customers special deals through mobile marketing programs. Unlike other location-based technologies, the "iBeacon" beacon is a one-way transmitter to the receiving devices, which ensures that the tollway application can track the location of the device, not the beacon itself. This system alleviates privacy concerns and avoids issues with disparate privacy policies that may exist in various jurisdictions through which the roadway runs.

Alternatively, the tollway application can be energized at other times and used beyond the tollway context to monitor non-toll roads and collect traffic data for toll roads and non-toll roads alike. The roadway and tollway authorities can use this data to plan for future roadway construction projects, as well as to detect changes in traffic patterns before they become problematic so that short term or long term solutions can be implemented in advance. More specifically, embodiments of the invention are used to accurately calculate VMT, which is the total amount of miles of vehicle travel within a specified region for a specified time period. Taxing vehicles on VMT has long been considered to be a more equitable mechanism to tax drivers to pay for highway maintenance and construction costs based on the number of miles driven as opposed to fuel consumption taxes. Aggregate VMT data is often a fundamental data point used for transportation planning, the development of emission control policies, and the evaluation of expected environmental impact of infrastructure projects. However, current methods for calculating VMT use estimates, sampling, and extrapolation (e.g., traffic counts, aggregate odometer data), which are either inherently inaccurate or are based on data that is difficult or costly to obtain and update. Embodiments of the present invention can easily track VMT of individuals by implementing the system and method on all roadways, and then aggregate VMT by extrapolating that data to account for vehicles that do not use the tollway application, which would provide for much greater accuracy than what can be achieved with currently available methods. To the extent that governments decide to shift the fuel consumption tax to a VMT tax, those entities could require taxpayers to use the tollway application in order to accurately assess taxes on individuals and users. Incentives such as discounts on VMT taxes assessed could be used to encourage drivers to use the tollway application. In these cases (e.g., where the application is to be activated whenever the user operates a vehicle), the activation of the application could be tied to the ignition initiation or some other location-based trigger (e.g., beacon installed in vehicle).

As shown in FIG. 1, geomagnetic tollway map 100 is generally comprised of roadway 102 and unique magnetic signatures for particular geographic points 104 on the Earth. Because magnetic fields are vector quantities, the Earth's magnetic field can be represented by a three-dimensional directional vector along with magnetic field strength at any point on the planet. Vector components may be expressed in a multitude of ways, including in units of tesla (T) with respect to magnetic field strength, and three-dimensional numerical representations of the vector heading (e.g., degrees of rotation to represent the directional aspects of three axes in relation to magnetic north). After unique magnetic signatures have been measured and recorded by magnetometers in whatever spacing deemed useful to the tollway geography, the magnetic signatures of each geographic point can be uploaded to a database of magnetic signatures in conjunction with the connection graph. It is against this database containing the prerecorded magnetic signatures that magnetic signatures recorded and transmitted wirelessly from mobile devices (e.g., smartphones, magnetometers installed in vehicles with wireless transmission capability) are compared to determine when and where a vehicle travelling along a tollway has crossed any one of prerecorded geographic points 104. In certain embodiments of the invention, the creation of the graph of magnetic fingerprints involves using additional data to provide for a more efficient connection of magnetic signatures within the connection graph. In these embodiments, the direction of movement along the roadway while the magnetic signatures are being recorded is also being recorded. The direction of movement is often calculated using a combination of change in heading data (from the magnetometer) and proper acceleration data, which is generally measured by an accelerometer that is incorporated into a smartphone mobile device or incorporated into the vehicle itself. Although many of the disclosed embodiments refer to smartphones when describing aspects of the invention, other mobile devices equipped with magnetometers or equivalent measurement instruments can be used in their place in most embodiments of the invention.

Several samples of geomagnetic signatures taken over a distance of perhaps several meters are generally recommended to obtain an accurate assessment of the user's location necessary for a confirmation that the user is travelling on a tollway. Once this location confirmation has been made, continuous geomagnetic signature observe-and-match functionality allows tollway authorities to track vehicle traffic along the tollway as represented in geographic tollway map 100.

Processing of the data that comprises the magnetic signatures can facilitate and even expedite the matching process associated with confirming that a particular vehicle has travelled across particular geographic points 104. The processing of the measured raw data from the magnetometer can be independently performed, or can be outsourced to commercial processing providers, which can also perform the matching function. The matching and comparison process can be implemented in a variety of ways to improve the speed at which the system confirms a match between points on the connection graph and the magnetic signature readings transmitted from the vehicle. For example, magnetic signatures comprised of a combination of heading-related data in relation to magnetic north and a magnetic field strength value will be finite for a particular geographic point. However, the matching process does not necessarily depend on perfect match (e.g., down to the square millimeter) to confirm that the vehicle has crossed over a prerecorded point. Instead, certain embodiments of the invention will incorporate preselected thresholds or signature tolerances into the matching process to account for variable lateral and vertical positioning of the magnetometer within the vehicle (e.g., mobile phone with magnetometer in the driver's pocket, magnetometer incorporated into dashboard of vehicle, interior of sedan lower than interior of truck, etc.) or variables associated with the vehicle's position within a particular lane, for example. Such embodiments can streamline the data processing to provide positioning confirmation adequate or necessary for accurate tollway traffic tracking without requiring pinpoint accuracy that could result in unnecessarily requiring exponential processing of data while providing little or no benefit to the tollway tracking function.

Figure 2:
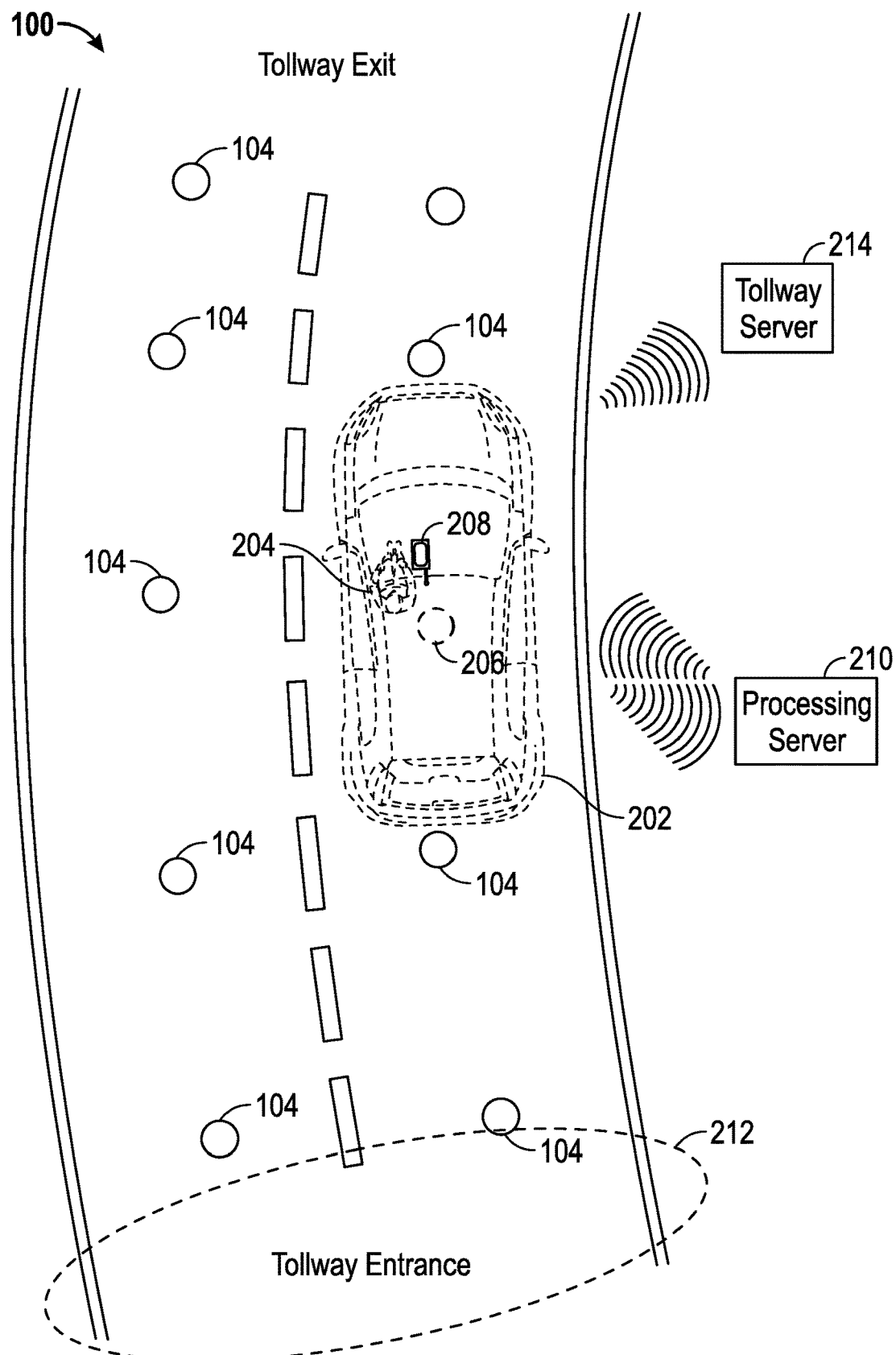
FIG. 2 is a diagram of a portion of a tollway embodying the principles of the invention.

The magnetic signature matching process can occur in a multitude of ways. In one embodiment of the invention, as shown in FIG. 2, vehicle 202 driven by driver 204 is crossing geographic point 206. Driver 204 is alone in vehicle 202 and is in possession of smartphone 208, which is equipped with a magnetometer. Driver 204 has installed a tollway application on smartphone 208 that records magnetometer measurements and wirelessly transmits the raw data to processing server 210. The matching process can be performed at server 210 or the processed data can be transmitted back to smartphone 208. Various embodiments of the invention may utilize standard wireless communications, DSRC services and technology resident on onboard computers, or similar communication protocols. In this embodiment, smartphone 208 records that it has crossed geographic point 206. In certain embodiments, the matching and/or processing steps can be performed locally by the smartphone, onboard computer, or equivalent mobile device equipped with a magnetometer or similar measurement instrument.

To conserve energy while driver 204 is not travelling near tollways, the tollway application can operate in the background until vehicle 202 enters into or passes through geofence 212, which uses the GPS functionality in smartphone 208 to signal the tollway application that smartphone 208 has entered into tollway-relevant geographic area. Other embodiments utilize beacons located at the tollway entrances and exits to perform the same function as geofence 212, or alternatively, can provide a redundant triggering mechanism when used in conjunction with geofences located at the tollway entrances and exits. The geolocation and radius value of each geofence will depend on various factors (e.g., tollway density within a geographic area, the speed at which vehicles will be travelling through the geofence), but will generally be calibrated to ensure the accurate energization of the tollway application once GPS has confirmed the entrance of the vehicle onto the tollway. Therefore, in this embodiment of the invention, once vehicle 202 enters into geofence 212, the tollway application is energized and begins to measure and/or record magnetic signatures and transmit them to server 210 for processing and matching.

Once a match has been made in accordance with whatever preselected threshold comparison or tolerance values have been deemed appropriate for the tracking exercise, the confirmation that vehicle 202 has passed across prerecorded geographic point 206 is transmitted back to smartphone 208 and the tollway application. At that point, the information can be wirelessly transmitted to tollway server 214, or alternatively, can be cached in the tollway application for subsequent transmission to tollway server 214. For example, caching and subsequent transmission may be used in areas where wireless communications are less than optimum or are temporarily interrupted. In any event, the ultimate transmission of the information confirming the passage of vehicle 202 across the various geographic points along geomagnetic tollway map 100 is sent to tollway server 214 in order to facilitate the assessment and collection of tolls. In the embodiment shown in FIG. 2, vehicle 202 has crossed prerecorded geographic point 206 and will continue to cross subsequent geographic points 104 as it progresses from the tollway entrance to the tollway exit. As mentioned previously, the magnetometer and equivalent of the tollway smartphone application may be incorporated into vehicle 202 (e.g., one or more onboard computers). In any event, once vehicle 202 ceases to cross prerecorded geographic points 104, or crosses a geographic point associated with a tollway exit, the smartphone application can revert back to running in the background to conserve power until vehicle 202 passes through another geofence that indicates that vehicle 202 may be entering into another tollway-relevant geographic area. In other embodiments, the application may continue to run in order to collect data relating to traffic patterns and usage of non-toll roadways.

Should vehicle 202 fail to cross a charge or exit threshold corresponding to a prerecorded geographic point within an estimated time period from a particular geofence border, an internal alert within the tollway application may be triggered to indicate that vehicle 202 is disabled, the tollway application is disabled or malfunctioning, vehicle 202 has improperly exited the tollway (e.g., driving off tollway onto the frontage road before reaching an authorized exit), or there is another situation requiring attention or resolution. Entering the geofence (or crossing into range of a beacon located at the tollway entrance), but failing to exit the tollway in a reasonable amount of time may itself indicate that vehicle 202 is no longer moving or that a transmission failure has occurred. Once triggered, the alert can be relayed to tollway server 214 for troubleshooting, which can lead to roadside assistance being dispatched or other corrective or investigative being taken. Depending on the alert resolution, a toll charge may be issued by tollway server 214 if the tollway authority tasked with issuing tolls concludes that such a charge is appropriate.

Depending on the preference of the tollway authority and the extent of the application of the invention across tollways owned by particular tollway authorities or groups of tollway authorities, tollway server 214 can calculate the appropriate tolls based on the signature matched transmission from smartphone 208, and either forward that information to the appropriate tollway authority, or the tollway authority can choose to calculate the toll itself based on the tollway record information received from tollway server 214. Automatic payment options can also be triggered as soon as the final tollway charge has been assessed. Because toll assessment, toll billing, and toll collection may not be time critical activities, tollway authorities may prefer to cache the tollway record history of driver 204 until regular processing intervals (e.g., monthly) so as to decrease the number of and cost of the toll assessment, billing, and payment transactions. It is also expressly envisioned that, instead of physical designated computer servers described in relation to various embodiments of the invention, cloud-based systems, solutions, and applications can be employed to achieve the same or similar results.

Figure 3:
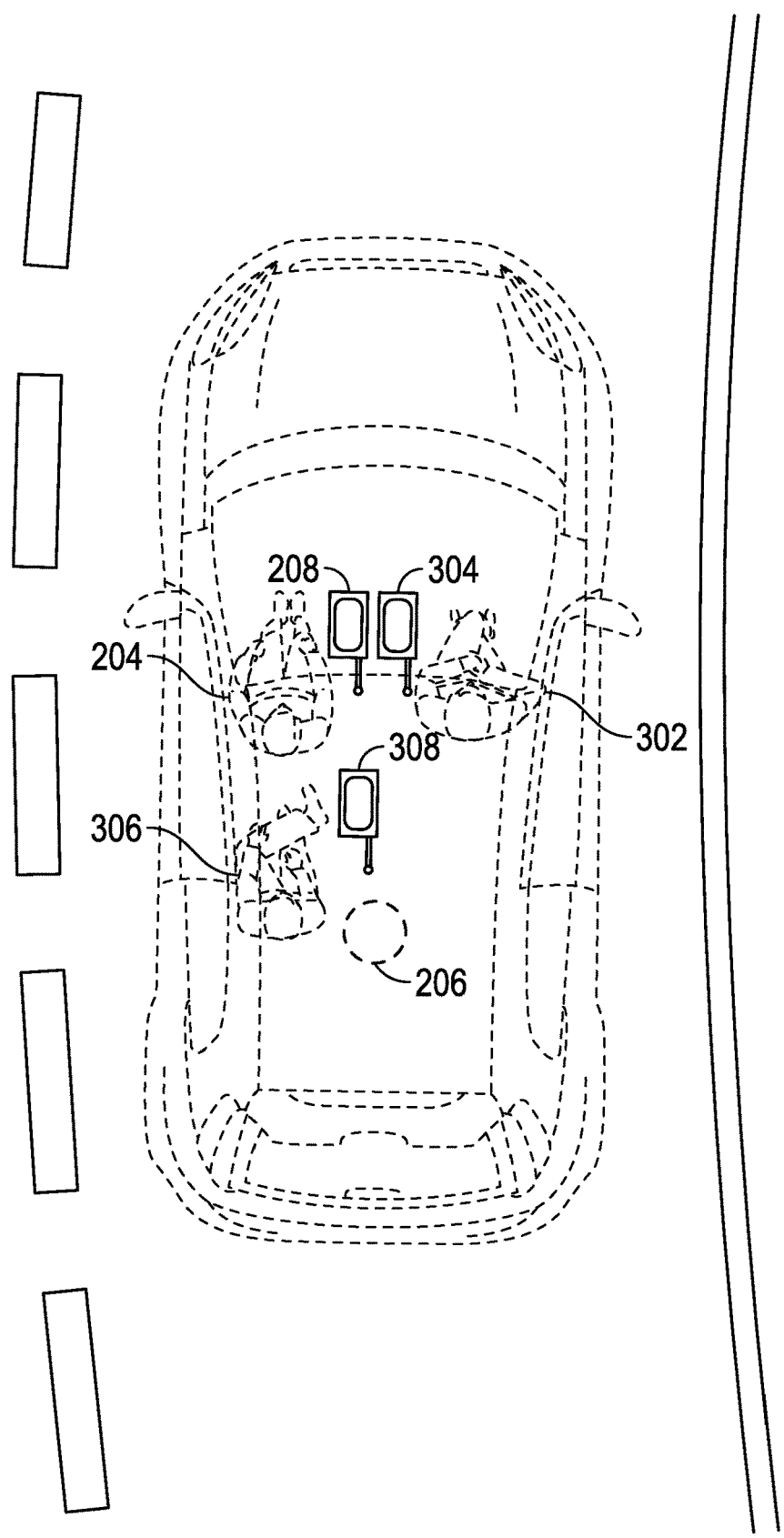
FIG. 3 is a diagram of a portion of a tollway embodying the principles of the invention using a vehicle that includes a driver and two passengers.

FIG. 3 shows an embodiment of the invention in which a vehicle with driver 204 and passengers 302 and 306 is travelling along a tollway. In this example, driver 204 has smartphone 208, passenger 302 has smartphone 304, and passenger 306 has smartphone 308. If driver smartphone 208 is the only device with the tollway application installed, the process will effectively operate as shown in FIG. 2. However, if multiple devices in one vehicle have the tollway application installed, then various options are available to determine which account tied to which device will be assessed the appropriate tolls. One option is to push a message to all of the tollway-configured devices in the vehicle to determine which account will be responsible for paying the tolls. Another option is to default to the account tied to a tollway-configured device that is integral to vehicle 202 if multiple devices indicate that they have crossed over matching geographic point 206. Certain embodiments of the present invention include making instantaneous marketing offers to the driver and the passengers via their smartphones based on a variety of factors (e.g., proximity of retail location, purchasing preferences).

The capability of tracking driving patterns can also be used to assess the toll to the proper individual in a vehicle in which multiple tollway applications are running. For example, if there are two smartphones in a single vehicle traveling on a tollway that one user travels every day, but that the other user has only used occasionally, the system can default to charging the high-usage user of the tollway. Another embodiment of the invention envisions that family plans or accounts are used so that whenever two members of the same family are in one vehicle, the system recognizes two related smartphone applications running in the same vehicle, and bills the family account for the toll transaction without further analysis. Alternatively, embodiments of the invention can primarily utilize a tollway application, magnetometer, and accelerometer incorporated directly into the vehicle itself to eliminate complications associated with multiple smartphones in a vehicle altogether.

It is expressly envisioned that embodiments of the invention will be particularly useful, and even necessary, in environments that choose to utilize variable tollway pricing based on the number of vehicle occupants. Currently, many roadways include high-occupancy vehicle (HOV) lanes that can be accessed exclusively by vehicles with one or more passengers. If the occupants of a particular vehicle each had the tollway application installed on their smartphone, for example, the tollway authority could choose to assess tolls based on the number of individuals in a vehicle. For example, tolls assessed to vehicles with three or more people could be lower than vehicles with only two people to encourage higher density carpooling. Also, high-occupancy toll (HOT) lanes are in use that provide HOVs access at no charge, but assess other vehicles a variable toll based on demand. Some embodiments of the invention would allow such systems to accurately and cost-effectively determine how many individuals are in each vehicle to facilitate the proper assessment of tolls. Other applications of embodiments of the invention include use in the "express" toll lanes that charge tolls based solely on the level of demand. Charging tolls based on the level of demand is facilitated by the ability to accurately and effectively monitor the tollways and various traffic patterns. Embodiments of the invention are able to provide such data on an individualized basis to facilitate the proper assessment of tolls and to potentially provide tailored incentives and promotions designed to encourage or discourage drivers from using particular roadways or tollways depending on demand or other considerations such as the number of passengers in each vehicle.

Figure 4:
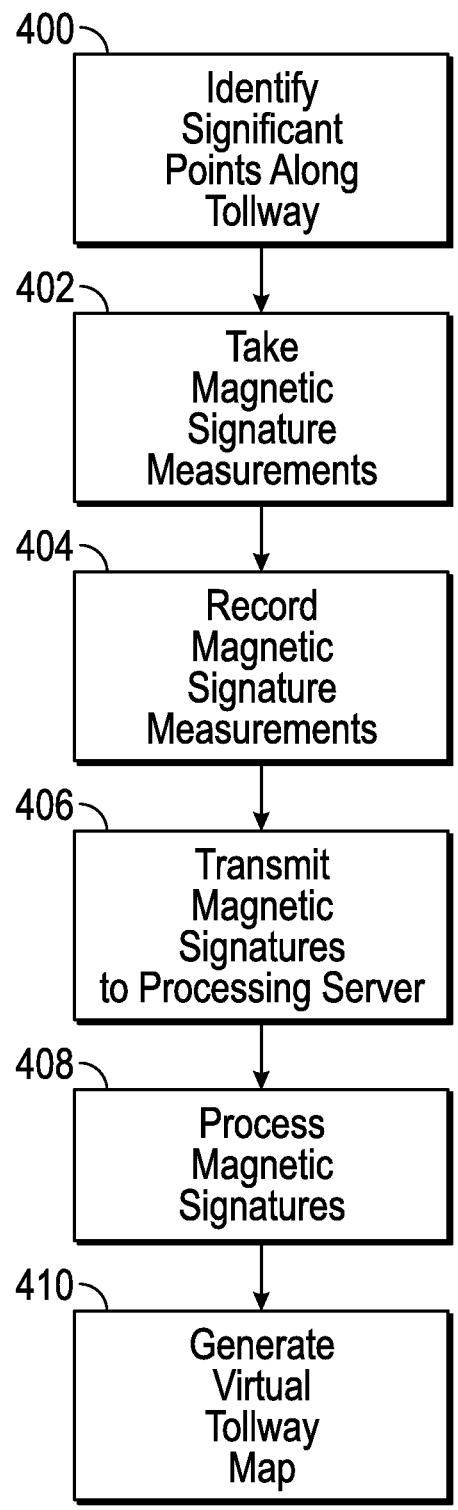
FIG. 4 is a flow chart depicting the tollway mapping aspects of one embodiment of the invention.

FIG. 4 shows a flow chart of some of the tollway mapping steps performed in an embodiment of the invention. Beginning step 400 marks the beginning of the tollway mapping process. At step 400, points along the tollway are identified that will comprise the tollway map. At step 402, magnetic signatures are measured for predetermined points that were identified and selected in step 400 as appropriate to track tollway use (e.g., tollway entrance points, tollway exit points, tollway intermediate points, etc.). Measuring step 402 can be accomplished using a magnetometer. At step 404, associated software (e.g., installed on a mobile processing device with an incorporated magnetometer) records the magnetic signatures taken at step 402. At step 406, the magnetic signatures are transmitted or otherwise uploaded to a processing server to facilitate or otherwise simplify the magnetic signature matching process. Once the magnetic signatures of the predetermined tollway points have been processed at step 408, a virtual tollway map is generated from the processed magnetic signatures of the predetermined points at step 410. The tollway map may take the form of a database or any other software program or application that facilitates the matching of the magnetic signatures of the predetermined points with those received from the vehicles travelling along the tollway. It is also expressly anticipated that the number and positioning of the predetermined points may be altered or revised over time to improve the efficiency or accuracy of the tollway system based on assessments that occur during start-up or over the course of time.

Figure 5:
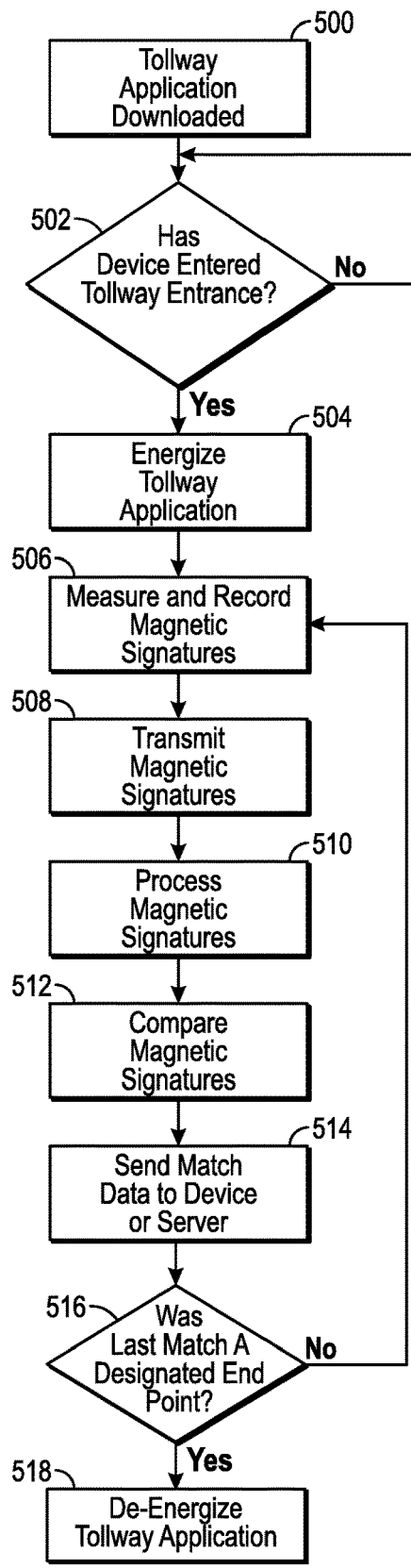
FIG. 5 is a flow chart depicting the tollway tracking aspects of one embodiment of the invention.

FIG. 5 shows a flow chart of some of the tollway tracking steps performed in an embodiment of the invention. At step 500, the tollway application is downloaded or otherwise installed onto the tollway device (e.g., smartphone, onboard computer, portable and intelligent device equipped with a magnetometer or similar measurement instrument, etc.). The application remains in the background of the device to conserve energy until the device travels within a tollway GPS geofence. At step 502, if the device enters into a tollway GPS geofence, the tollway application is energized at step 504 and no longer operates in the background of the device, but becomes fully functional with respect to the tollway application. Once the tollway application becomes active, it starts measuring and recording magnetic signatures of the points of the tollway across which the vehicle is travelling at step 506. At step 508, the magnetic signatures that were measured and recorded at step 506 can be wirelessly transmitted to processing server 210, which then is able to process the magnetic signatures at step 510.

Processing generally includes formatting magnetic signatures to facilitate the matching process using whatever threshold values or tolerances deemed adequate to assess whether a match between magnetic signatures has effectively occurred. At step 512, the processed magnetic signatures are compared with the magnetic signatures of the virtual tollway map or predetermined point database to establish that the vehicle containing the device is driving along the tollway. The confirmation of the matches resulting from comparison step 512 can then be transmitted to the mobile device or the tollway server at step 514. In some embodiments of the invention, however, the comparison step can be performed by the mobile device or the tollway server, negating the need to transfer that information to those devices. If the most recent match corresponds with a tollway endpoint or tollway exit point on the virtual tollway application, the application is de-energized and returns to its original state and runs in the background of the mobile device at step 518. In certain embodiments of the invention, the measuring, recording, processing, and comparison steps can be performed entirely by the tollway application running on the smartphone, onboard computer incorporated into the vehicle, or equivalent mobile device, thereby eliminating the need to transmit much of the information to and from various servers.

Once the tollway travel information (e.g., tollway identification, date and time that vehicle used tollway, etc.) reaches the billing authority, the collection of the tolls can be accomplished in multiple ways. For example, if a smartphone application is used to facilitate the invention, the application itself can process the toll transaction by automatically charging a financial card for the tolls after the vehicle exits the tollway, for example. Alternatively, one embodiment sends the information relating to the vehicle's tollway usage to a tollway server (or cloud computing equivalent), which then can send out tollway invoices to its customers electronically or in paper form. In this way, the tollway authority responsible for the tollway can maintain control over the billing process, which can facilitate rapid adoption and implementation of the embodiment of the invention most beneficial to the particular tollway authority.

Because embodiments of the invention are able to accurately and effectively track tollway and non-toll roadway traffic and congestion, it is envisioned that versions of the tollway applications will allow the user to enter his final destination into the application to produce a series of travel options in metropolitan areas that utilize both tollways and non-toll roadways. For example, after entering the final destination into the application, the system will instantaneously analyze the traffic status of the available routes and present the user with two options: Option #1 to arrive at his destination in 30 minutes for free using the non-toll roadway and Option #2 to arrive at his destination in 15 minutes on the tollway with a toll of $3.00. In this way, the user will be able to make an informed judgment as to what route to take to his final destination, which will depend largely on how much the user is willing to spend to reduce the amount of travel time to his ultimate destination.

Various embodiments of the invention utilize fallback location tracking features to mitigate any loss-of-location events that may be caused, for example, by a user that leaves the mapped/graphed tollway area or otherwise fails to travel across one or more of the prerecorded geographic points (e.g., driving on auxiliary road or shoulder of road due to traffic accident rerouting). Such embodiments can rely on traditional GPS triangulation or data recorded by an accelerometer (e.g., incorporated into smartphone or vehicle), or a combination of both of these, to locate a user that has strayed from the normal tollway route.

Figure 6:
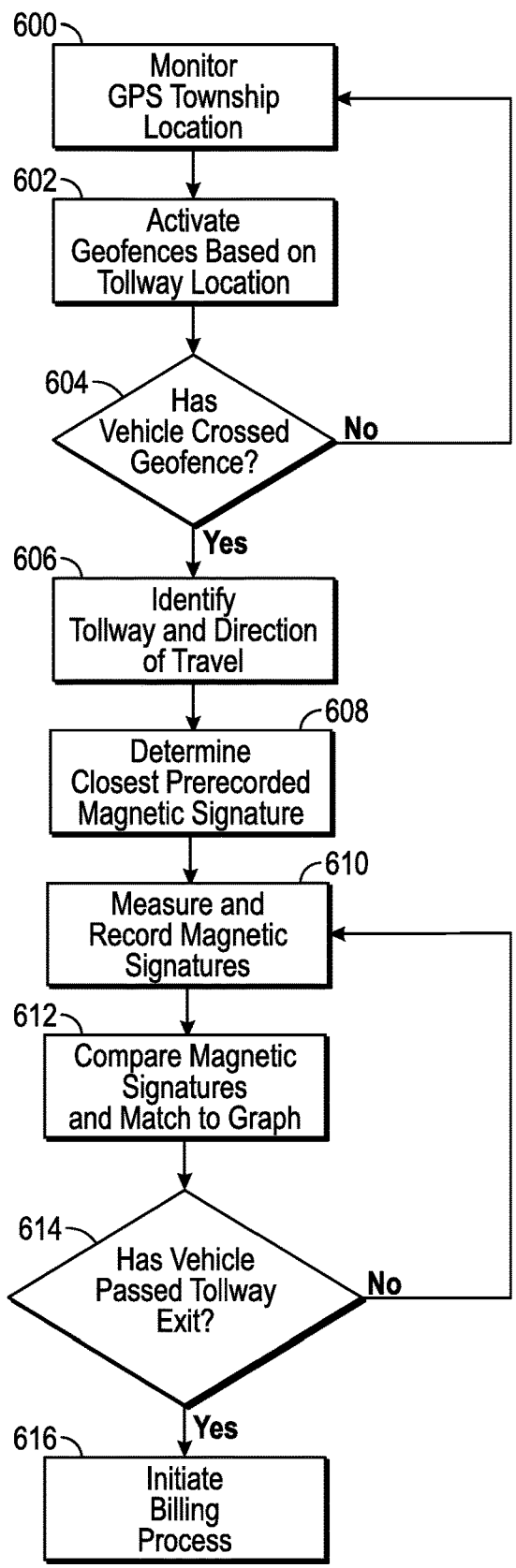
FIG. 6 is a flow chart depicting the tollway tracking aspects of one embodiment of the invention that utilizes GPS functionality.

FIG. 6 shows a flow chart of another embodiment of the tollway tracking system that employs GPS functionality in conjunction with the geomagnetic signature matching process. At step 600, GPS monitors the location of the smartphone, or the GPS-equipped vehicle, in relation to township grids, which represent a large enough area to limit the number of activated geofences to those associated with tollways in the user's general geographic area. Based on the information relating to the relevant township grid, the appropriate geofences are activated at step 602. The determination of whether the vehicle has crossed one of the geofences occurs at step 604. If the vehicle has not entered into one of the activated geofences, township monitoring and geofence activation continues. Once the vehicle crosses into one of the tollway geofences, the relevant tollway and vehicle direction of travel is identified at step 606 using GPS functionality. At step 608, the closest prerecorded geomagnetic signature to the vehicle is determined. As the tollway application becomes energized, it begins to measure and/or record geomagnetic signatures at step 610. At step 612, the geomagnetic signatures from the tollway application are compared to the closest prerecorded geomagnetic signature, and subsequently to other prerecorded signatures along the connection graph, to confirm that the vehicle has entered onto the tollway and is continuing along the tollway as expected. This process continues until step 614, when the determination is made by comparing prerecorded geomagnetic signatures with the dynamic measuring of geomagnetic signatures as measured by the tollway application that the vehicle has exited the tollway or the tollway has ended. If there is no such determination, the measurement and comparison processes continue to track the vehicle's progress along the tollway. If the comparison process confirms that the vehicle has crossed over a prerecorded point at a tollway exit, the tollway billing process (e.g., toll collection procedure) is initiated at step 616.

Figure 7:
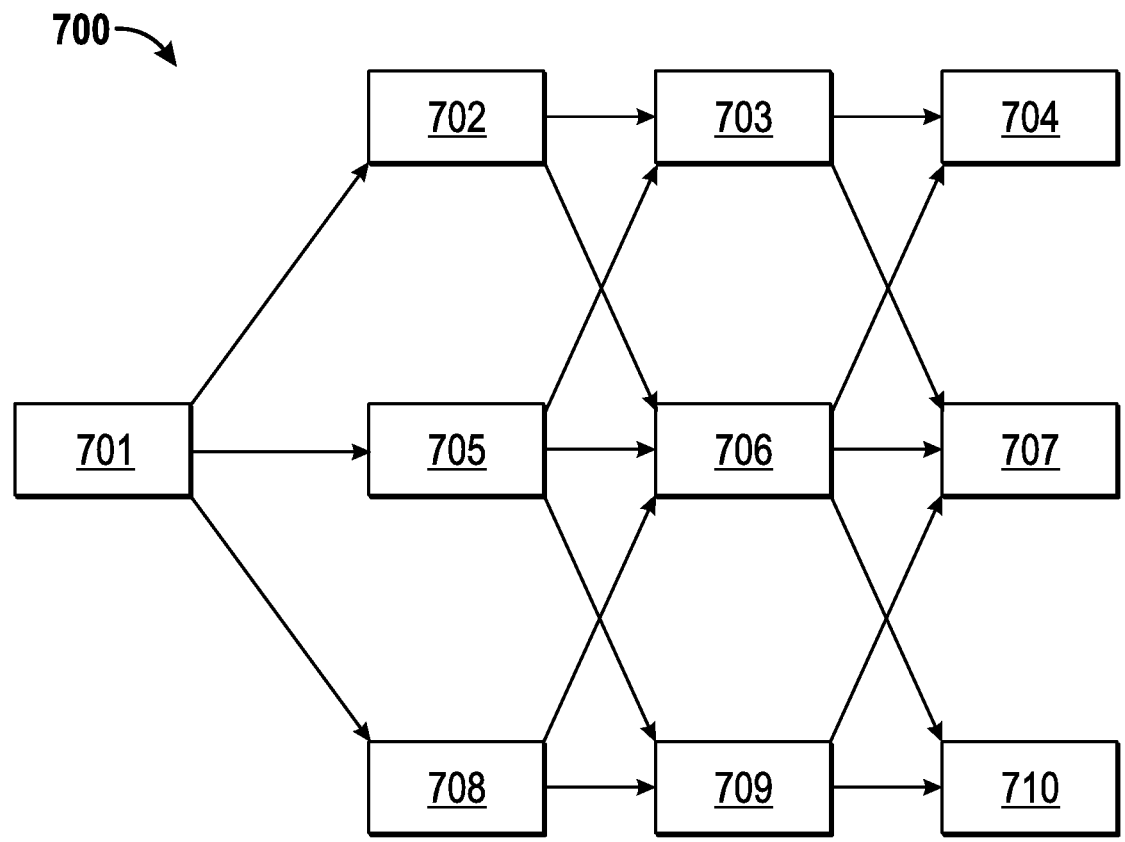
FIG. 7 is a diagram representing a portion of an exemplary connection graph of magnetic signatures.

FIG. 7 represents a portion of a connection graph of magnetic signatures. Connection graph 700 shows a series of magnetic signatures with arrows indicating the connections between the signatures that comprise paths of magnetic signatures that facilitate directional signature matching and vehicle travel predictions (e.g., path creation and path finding). Threshold values for distances between the points representing the magnetic signatures as well as the directional angles between any two points may be selected based on vehicle travel patterns, roadway geography, and/or efficient signature matching models. Moving from left to right along the paths in connection graph 700 corresponds to moving forward in reality. Connection graph 700 begins at point 701, which can correspond to a tollway entrance ramp, and then branches off (or opens up) into three discrete paths (or lanes of traffic) at point 702, point 705, and point 708. Connection graph 700 anticipates vehicular movement from left to right while also allowing for lane changes that are represented diagonally in FIG. 7. For example, one connection path is comprised of point 701, point 702, point 703, and point 704. A similar though discrete connection path is comprised of point 701, point 705, point 706, and point 707, as well as one comprised of point 701, point 708, point 709, and point 710.

The arrows in connection graph 700 indicate the natural, predictable, and allowable headings and directional changes in this embodiment of a connection graph. Limited degrees of freedom indicate that a vehicle that enters onto a tollway entrance ramp at point 701 may enter into the tollway lane defined by point 702, point 703, and point 704. However, the vehicle may also change lanes, which can be represented, for example, by the connection between point 703 to point 707, or point 708 to point 706 to point 704. In this example, point 705 has three degrees of freedom (to point 703, point 706, or point 709), while point 703 has only two degrees of freedom (to point 704 or point 707). Limitations on the available degrees of freedom from point to point will vary depending on the roadway design and implementation characteristics employed. In many embodiments, there will be a much larger number of relevant data points than what is shown in FIG. 7. Although it is not necessary to limit connection paths to a certain number of degrees of freedom, roadway applications associated with certain embodiments of the invention will utilize general assumptions associated with normal traffic patterns. For example, while omnidirectional applications where the vehicle can travel along the arrows in the connection graph in both directions are available, one would not usually expect a vehicle to travel against the traffic flow under most circumstances. Therefore, efficient path creation can rely on various assumptions that will be true most of the time.

Embodiments of the invention may also take advantage of the precision locating functionality to track user driving patterns that can identify marketing opportunities and tailor advertisements based on geomagnetic signature matching indicating that a user is a frequent shopper of a store along a tollway, for example. In one exemplary scenario, a promotional text message may be issued to a smartphone running the tollway application when it recognizes that a geomagnetic match has been made when a vehicle pulls into a gas station to refuel. The text may provide an instant e-coupon for products within the convenient store providing the fuel to entice the customer to enter the store and make additional purchases in addition to the fuel.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for monitoring a vehicle travelling along a roadway comprising:
    means for measuring magnetic signatures of points along said roadway, means being located in said vehicle;
    a non-transitory computer readable medium with computer executable instructions stored thereon executed by a processor that transmits magnetic signature measurements from said vehicle over a communications network; and
    a server for receiving said transmitted magnetic signatures from said vehicle and comparing said received magnetic signature measurements with previously recorded magnetic signature measurements to determine the location of said vehicle along said roadway.

2. The system for monitoring a vehicle travelling along a roadway of claim 1 wherein said means for measuring magnetic signatures is a magnetometer.

3. The system for monitoring a vehicle travelling along a roadway of claim 1 wherein said non-transitory computer readable medium with computer executable instructions stored thereon executed by a processor records said magnetic signatures measurements.

4. The system for monitoring a vehicle travelling along a roadway of claim 1 wherein said non-transitory computer readable medium with computer executable instructions stored thereon executed by a processor is activated after receiving a signal that said vehicle has crossed a geofence defining a geographic area including at least a portion of said roadway.

5. The system for monitoring a vehicle travelling along a roadway of claim 1 further comprising a means for storing information relating to the location of said vehicle along said roadway.

6. A method for monitoring a vehicle travelling along a roadway comprising the steps of:
    receiving magnetic signature measurements of points along said roadway from a vehicle travelling along said roadway;
    comparing said magnetic signature measurements with previously recorded magnetic signature measurements to determine the location of said vehicle along said roadway; and
    identifying a vehicle pathway using said comparison of said magnetic signature measurements with said previously recorded magnetic signature measurements.

7. The method for monitoring a vehicle travelling along a roadway of claim 6 further comprising the step of sending a signal to said vehicle to begin measuring magnetic signatures of points along said roadway.

8. The method for monitoring a vehicle travelling along a roadway of claim 7 wherein said signal is triggered when said vehicle crosses into an activated geofence.

9. The method for monitoring a vehicle travelling along a roadway of claim 7 wherein said signal is triggered when said vehicle by a beacon located along said roadway.

10. The method for monitoring a vehicle travelling along a roadway of claim 6 further comprising the step of initiating a toll collection process after said vehicle passes over a point demarcating the termination of a tollway.

11. The method for monitoring a vehicle travelling along a roadway of claim 6 further comprising the step of calculating the vehicle miles travelled for said vehicle for the said vehicle pathway.

12. The method for monitoring a vehicle travelling along a roadway of claim 11 further comprising the step of aggregating the total vehicle miles travelled for said vehicle during a specific time period.

13. The method for monitoring a vehicle travelling along a roadway of claim 6 further comprising the step of sending a marketing communication to an individual within said vehicle.

14. The method for monitoring a vehicle travelling along a roadway of claim 13 wherein the sending of said marketing communication is triggered by a beacon located along said roadway.

15. The method for monitoring a vehicle travelling along a roadway of claim 6 further comprising the step of storing said vehicle pathway in a database to facilitate the assessment of toll charges.

16. A method for monitoring a vehicle travelling along a roadway comprising the steps of:
    receiving magnetic signature measurements of points along said roadway from a vehicle travelling along said roadway;
    comparing said magnetic signature measurements with previously recorded magnetic signature measurements to determine the location of said vehicle along said roadway;
    calculating a toll based on the distance travelled by said vehicle on portion of said roadway subject to a toll as determined by said comparison of magnetic signature measurements demarcating the beginning and end points of said roadway subject to said toll; and
    assessing said toll on operator of said vehicle.

17. The method for monitoring a vehicle traveling along a roadway of claim 16 further comprising the step of documenting said distance travelled by said vehicle on portion of said roadway subject to said toll and information relating to the date and time at which said vehicle travelled on portion of said roadway subject to said toll.

18. The method for monitoring a vehicle traveling along a roadway of claim 17 wherein step assessing said toll on operator of said vehicle comprises the step of providing said owner of said vehicle with information relating to the date and time at which said vehicle travelled on portion of said roadway subject to said toll.

19. The method for monitoring a vehicle traveling along a roadway of claim 16 further comprising the step of storing the assessed toll in an accounts receivable database.

20. The method for monitoring a vehicle traveling along a roadway of claim 16 wherein said operator of said vehicle is identified by the tollway application that is transmitting magnetic signature measurements of points along said roadway from a vehicle travelling along said roadway.

* * * * *